Feb. 27, 1951 M. A. LIPKAU 2,543,321
APPARATUS FOR THE DELIVERY OF PREDETERMINED
VOLUMES OF LIQUID
Filed Nov. 12, 1946 2 Sheets-Sheet 1
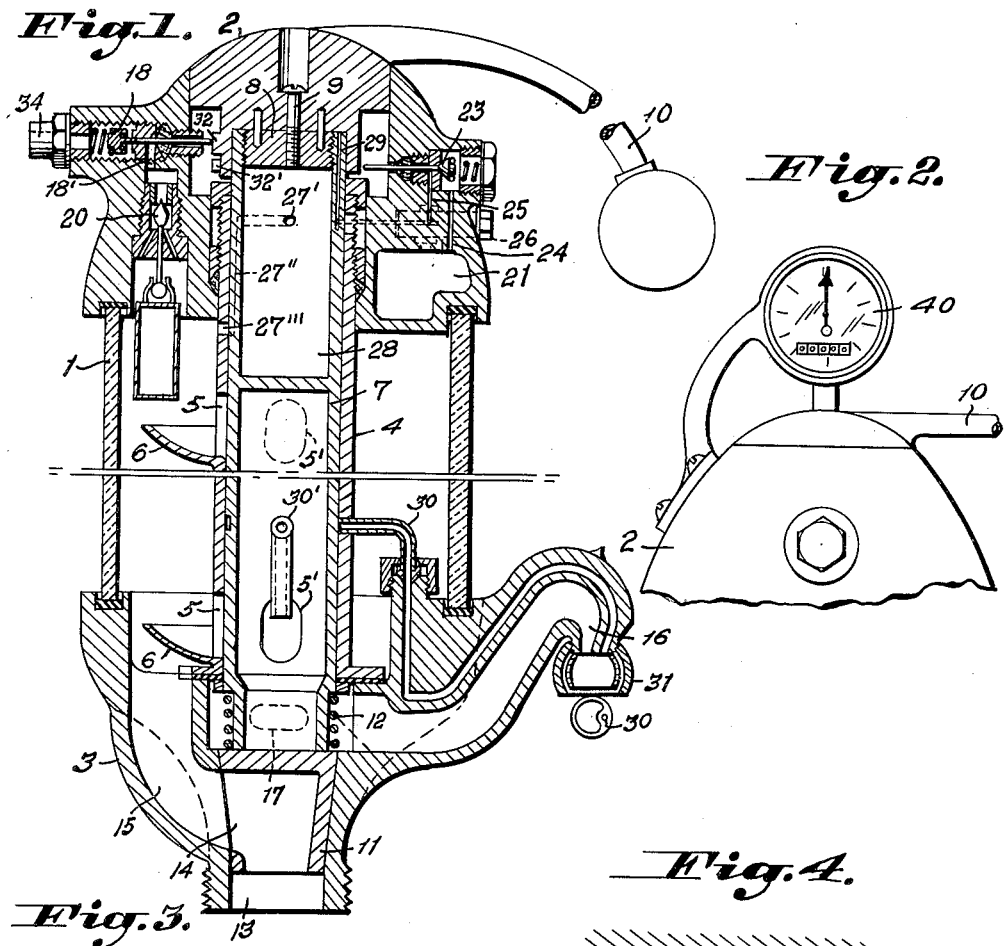
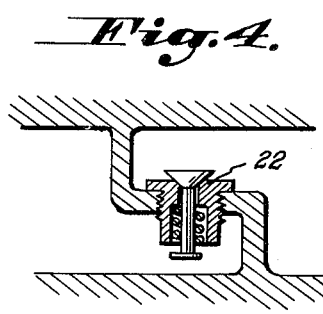
Inventor
Maximiliano A. Lipkau
Attorneys

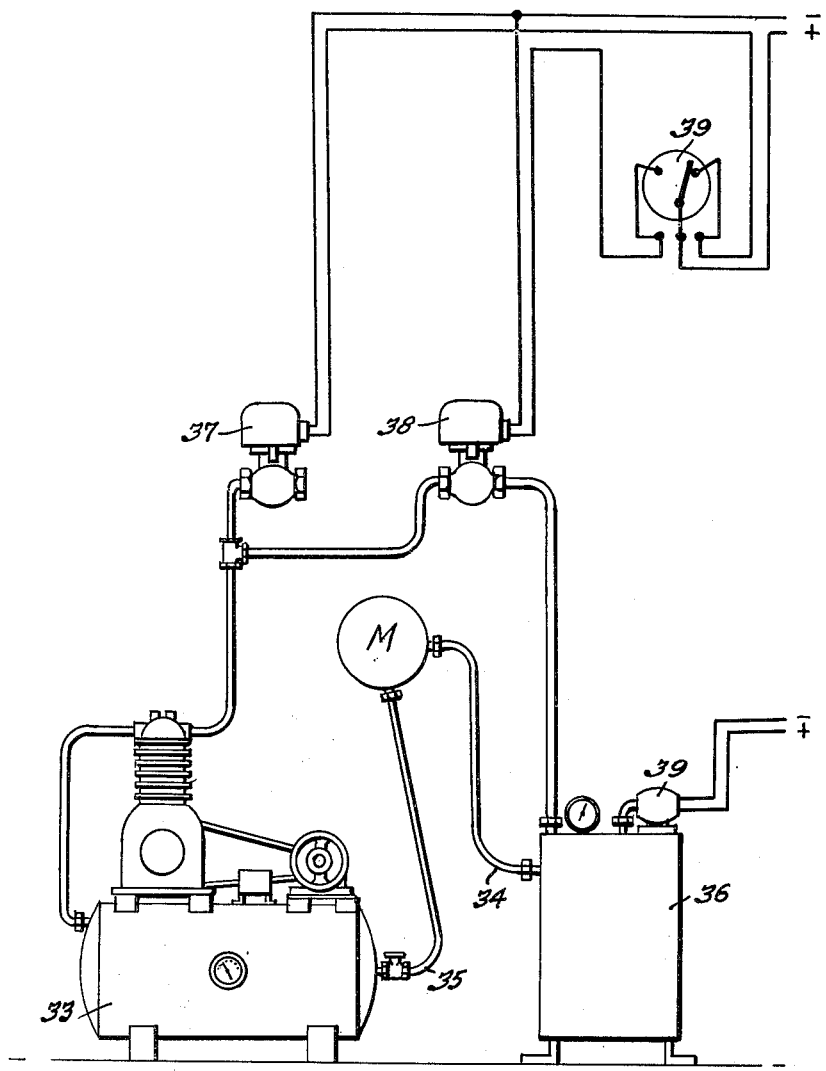

Patented Feb. 27, 1951

2,543,321

UNITED STATES PATENT OFFICE 2,543,321

APPARATUS FOR THE DELIVERY OF PREDETERMINED VOLUMES OF LIQUID

Maximiliano Alvarez Lipkau, Barcelona, Spain

Application November 12, 1946, Serial No. 709,292
In Spain September 21, 1945

Section 1, Public Law 690, August 8, 1946
Patent expires September 21, 1965

8 Claims. (Cl. 222—394)

The present invention relates to improved measuring or metering apparatus for delivering predetermined volumes of liquid and to a system of connections of such apparatus with sources of vacuum and of compressed air produced by a compressor.

In a separate specification in the name of the same applicant, apparatus is described and claimed for the supply of definite volumes of liquids, which comprises essentially a receptacle with an internal pipe provided with apertures (ports or valves) at different heights, and which is connected at its lower part to a discharge conduit, the said apertures being capable of being opened or shut, all or some or a single one of them, as is required in each case, by the simple rotation of a device which can be actuated from the outside, which also serves for interrupting or establishing the communication of the said receptacle with the supply vessel or tubing.

The object of the present invention is to provide in the discharge conduit or outlet a uniform volume of flow during the whole of the discharge period, thus avoiding the final dribbling which retards the operation, and so to arrange the apparatus that it can be suitably connected to sources of vacuum and pressure for the purpose of accelerating the operations of refilling and discharge, utilising for this object by the interposition of suitable elements with a purpose and function to be hereinafter described, compressors already existing in the places where the apparatus is to be used, for instance servicing stations, airports, garages and the like.

In order to obtain the results mentioned the following steps are taken:

(a) The vertical ports of the central internal pipe are provided with pan-like extensions for the purpose of preventing a reduction of the outlet area as the fall in the level of the liquid progressively uncovers them. This arrangement is equivalent to using a horizontal port, parallel with the surface level of the liquid, with the result that the outlet area remains practically constant until the completion of the operation.

(b) A tube is placed at a level slightly higher than that of the liquid when it is at its lowest level, in order that any air that may still remain inside the receptacle may be able to leave it by this tube and not through the liquid, causing dribbling or bubbles.

(c) Suitable arrangements are provided in the apparatus for its rapid and automatic connection at the correct moments to appropriate sources of vacuum and compressed air, preferably utilising as these sources the air compressors already usually possessed by servicing stations, garages, airports and the like, where they are used for distributing lubricating oils, gasoline, petrol, gas oil and the like.

Two constructional examples of apparatus according to the invention, together with an installation diagram, are illustrated by way of example in the accompanying drawings, in which:

Figure 1 shows in sectional elevation a first constructional form of the apparatus, Figure 2 is an outside view of the upper part of the same apparatus;

Figure 3 is a transverse section at the level of the valves communicating with the sources of vacuum and compression;

Figure 4 is a detail of the separation of the air chambers;

Figure 5 is an installation diagram.

The apparatus according to Figures 1 to 4 consists essentially of a cylindrical receptacle 1 of a certain known volume, constructed for preference of glass or similar material, provided at both ends with covers 2 and 3, of cast material or metal, these covers being connected with one another by means of a tube 4, provided with ports 5 arranged at different heights, which are continued at their outside part with extensions 6 similar to pans. In the interior of this tube 4 is provided another tube 7 concentric therewith provided with ports 5' at the same heights as those mentioned previously, and having at its upper part a member 8, connected solidly therewith, and fixed in its turn by means of a screw 9 or other means, to a control handle 10. At its lower end the said tube 7 fits into a closing cone 11, which is held constantly against its seating in the cover 3 through the action of a spring 12. This closing cone 11 communicates on the one hand with a liquid inlet 13, and on the other hand through a lateral port 14 and a corresponding conduit 15 with the interior of the receptacle 1. The interior of the rotary tube 7 is in communication with a discharge or delivery conduit 16 through a port 17.

The arrangements for connecting the receptacle 1 of the apparatus with sources of vacuum and compressed air comprise essentially a vacuum valve 18, a compressed air-inlet valve 19, a float valve 20, and one or more compressed-air chambers. Two such chambers are shown by way of example in the constructional form in the drawing, indicated by 21 and 21' of equal volume and communicating by means of a non-return valve 22 (Figures 3 and 4), each of these chambers communicating with an air-outlet valve 23 and 23' respectively, through corresponding conduits 24 and 24'. The vacuum valve 18 communicates with the float valve 20 by means of a conduit 18', and the compressed-air valve 19 is in communication with the chamber 21 by means of a conduit 19'. These valves 23 and 23' communicate through conduits 25 and 25' respectively with a compressed-air inlet valve 26 and through a bore 27' with an expansion chamber 28. From this chamber communication may be established with the interior of the receptacle 1 by means of the same bore 27' already mentioned, a vertical conduit 27'' and a bore 27'''. 29 is a conduit communicating with the atmosphere as will be hereinafter explained. 30, 30' is an air-outlet conduit, and 31 is a screen provided in the outlet to prevent splashing. 32 and 32' are cams rigid with the control lever 10 for controlling the various valves.

With regard to Figure 6, M is the measuring or metering apparatus shown in Figure 1, 33 is a compressed-air tank, 36 is a vacuum tank or auxiliary receptacle in which a vacuum is created, 34 and 35 are pipes connecting the apparatus M with the tanks 36 and 33 respectively, 37 and 38 are valves controlling the suction inlets of the compressor, and 39 a change-over switch combined with a pressure gauge for maintaining the vacuum in the receptacle 36 within predetermined limits.

In Figure 2, 40 represents an integrating meter for the number of units of liquid delivered. It is actuated in a known manner by the control lever 10.

This apparatus operates as described hereinafter:

The vacuum valve 18 being connected to the vacuum pipe line 34 communicating with the vacuum tank 36, and the compressed-air inlet valve 19 likewise being connected to its piping 35, and a tube being screwed to the lower part 13 of the apparatus and inserted as far as the bottom of the receptacle containing the liquid to be raised, the said tube being provided at its lower end with a non-return valve, we have the following result: The cam 32 on the control handle 10 holds open the valve 18, thus effecting the evacuation of the receptacle 1 through the float valve 20, which will be held open by its own weight. In this position the ports 5' of the central tube 7 will be closed and the port 14 of the cone 11 open. In these conditions the apparatus will become filled with liquid, which, on reaching a high level, will automatically close the float valve 20.

When the control handle 10 is rotated in the appropriate direction, the cam 32' opens the compressed-air inlet valve 19 and keeps it open during a certain time for the purpose of filling the chambers 21 and 21'. As has been said, these chambers are of equal volume and communicate with one another by means of the non-return valve 22, shown in detail in Figure 4, so that if air is withdrawn from the chamber 21 a difference of pressure is produced between the two chambers, which causes the valve 22 to close, no more air escaping from the chamber 21'. If, instead of extracting air from the chamber 21, it is extracted from the chamber 21', the difference in pressure which ensues will tend to open the non-return valve, all the air in both chambers then escaping. By this means a metering is obtained of the air which is to enter the receptacle 1, the quantity being for example twice as great when a litre is issued as it is when half a litre is extracted.

By continuing the rotation of the handle, the air inlet valve 19 to the chambers 21 and 21' will be closed and the port 5, 5' will be opened, corresponding to the minimum quantity, for example half a litre. This port being opened, the cam 32' opens the valve 23, which receives air from the chamber 21 through the conduit 24, allowing it to pass to the inlet 26. In this static position of the handle, the bore 27' of the central tube 7 will be in alignment with the conduit 26, the air passing, therefore, to the chamber 28, where, on expanding, it will issue through the vertical conduit 27'' and the bore 27''' of the tube 4 to the inside of the receptacle 1, where it forces out the liquid contained in this latter, over the edge of the pan of the lowest of the opened ports 5, 5', and through the discharge conduit 16. If a change is then made to the next position, for example to one litre, it will be the valve 23' that will open and make way for the compressed air from the chambers 21, 21', which will then pass to the inside of the receptacle 1 through the conduits 25' and 26 and the chamber 28, just as has been explained for the issue of the half litre.

On passing from half a litre to one litre (taking these measures, of course, merely by way of comparison and reference) the communication of the receptacle 1 with the atmosphere or with the discharge conduit 16 is maintained constant, since the port for one litre opens before the closing of that for half a litre. To prevent any excess air that remains in the receptacle 1 after the required quantity has been delivered from producing bubbles on passing through the liquid remaining in the lower evacuation conduit, a tube or duct 30, 30' has been provided, through which any excess pressure in the receptacle, after the delivery of any quantity of liquid can escape to the outside.

From the zero position of the handle 10 until the half-litre port commences to open, the air-inlet conduit 26 to the chamber 28 remains closed and in communication with the atmosphere by means of the conduit 29, so that any air leakage in the valves may pass to the atmosphere.

The apparatus may be connected to pressure piping the pressure of which may be without inconvenience higher than ten atmospheres, for even when certain valves have leakages these pass to the atmosphere, for the apparatus always has an outlet to the outside in any position of the control handle, because until the port corresponding to half a litre is partly opened, the outlet to the atmosphere of the conduit 26 through the conduit 29 is not shut off. As it is required, as explained above, that the port corresponding to half a litre should not close until that corresponding to one litre has been opened, the result is that in the first movement of the handle, from its zero position to the start of the opening of the half-litre port, the admission of air from the conduit 26 is maintained in communication with the atmosphere through the conduit 29, and from this position to the end of its travel the communication with the atmosphere is maintained through the ports 5, 5'. The air-inlet conduit 26 is of smaller diameter than those communicating with the atmosphere. The security is therefore absolute.

With regard to the installation system according to Figure 6, the compressor on the tank 33 is provided with two suction inlets: one taking in air through the valve 38 from the receptacle 36, and another taking in air from the atmosphere through the valve 37. The result with this arrangement is:

If the valve 37 is open and the valve 38 shut, the compressor on working draws air directly from the atmosphere through the valve 37 and introduces it, compressed, into its corresponding adjacent tank 33. The compressor thus functions as a compressor properly so termed.

If, on the other hand, the valve 37 is closed and the valve 38 open, the compressor in working draws air from the tank 36 and creates a vacuum in it, so that this tank becomes a source of vacuum, and the compressor serves as a vacuum pump.

The result is then finally that the compressor fulfils the double function of a source of compressed air and a source of vacuum and that if the metering appartus M is put in communication as mentioned through the pipes 34 and 35 with the vacuum tank 36 and the compressed-air tank 33 respectively, it is then coupled to the two said sources of vacuum and compression, being in communication with one or the other according to whether the inlet 34 or the inlet 35 is open, and with neither if both inlets are closed.

The two valves 37 and 38 can be actuated simply by hand, or may preferably be combined with an arrangement which makes their working automatic, for the purpose of maintaining in the tank 36 a vacuum within prearranged limits, so that when the minimum pressure is reached the valve 38 closes and the valve 37 opens, and when the maximum is reached, the valve 37 closes and the valve 38 opens. This arrangement may consist of an automatic change-over or vacuum switch 39, which functions by furnishing current to the respective solenoids of the valves 37 and 38. When the solenoids do not receive current the valves are kept in the closed position through the action of opposing springs. The valve 38 may be replaced by an automatic valve with spring and plate, like the suction valve of a compressor.

With this installation, assuming that the metering apparatus M is provided with suitable connecting elements as described, and that the corresponding inlets are connected respectively with the vacuum and compressed-air sources, these inlets and communications opening and closing in dependence on the position of the controls of the apparatus, when communication is established with the vacuum receptacle a corresponding vacuum is created in the metering apparatus itself, and if such a phase coincides with that establishing communication of the receptacle with the liquid vessel, the consequent effect of suction and filling of this receptacle is produced. When, on the other hand, the connection is made with the source of compressed air, which will be assumed to occur exactly in the discharge phase of the metering apparatus, the pressure created in the interior of the apparatus will facilitate to a great extent the delivery of the liquid and will enable this to be done even in cases in which owing to the consistency or viscosity of the liquid, this would be difficult. In brief, the operation of metering is assured and accelerated, since the filling and evacuation are effected forcibly.

In carrying into practice the installations described, modifications may be made in accessories or details that are subsidiary to the features that constitute the essentials of the invention.

With the apparatus and system of connections described the following advantages are obtained in addition to those already described:

1. The volume of the outlet is regular, and the operation is very rapid whatever the fluidity of the liquid.

2. The liquid (especially oil) delivered by the metering apparatus can be led directly from the latter to a vehicle by means of a tube (preferably flexible), since the compressed air of the apparatus has the task of forcing it through and freeing it rapidly which represents a great saving in time, and cannot be effected by ordinary or electrical pumps, or in systems in which the compressed air is injected into the vessels containing the liquid, since in these latter the liquid remaining in the said conduit pipe cannot be freed.

Again with this system the liquid is taken directly from the vessels in which it arrives at the station, garage or airport, emptying into another container thus not being necessary and the vessels can be placed out of the way where they will not impede the movements of vehicles.

The apparatus described can be simplified by suppressing the chambers 21 and 21', and the valves 23, 23' and 22, with their corresponding cams 32', and by placing a pulsator on the valve 19 for the purpose of thus providing the air for forcing the ejection at will, all the rest of the apparatus remaining the same. On the other hand, and in view of the fact that the liquid admission pipe screwed to the lower part 13 of the apparatus generally carries at its lower part a non-return valve, the rotary cone 11 may also be omitted.

I claim:

1. Apparatus for the delivery of predetermined volumes of liquid, comprising: a metering receptacle formed with outlet apertures at different levels, means for opening and closing the said outlet apertures at will, a conduit communicating with the said outlet apertures for the discharge of liquid from the apparatus, a source of supply of liquid to be delivered, means for establishing and interrupting communication at will between the source of supply of liquid and the metering receptacle, means for connecting the metering receptacle to a source of vacuum, compressed air storage chambers, means for connecting one of the compressed air storage chambers to an external source of compressed air, an expansion chamber, means for connecting another of the compressed air storage chambers with the metering receptacle through said expansion chamber, non-return valve means connecting the compressed air storage chambers with one another, manipulating means for actuating the said opening and closing means, the said communication means and the said connecting means from outside the apparatus, and thereby filling the metering receptacle with liquid by suction and delivering the liquid through the discharge conduit, the manipulating means being so designed as to pass air from one or more of the storage chambers at will through the expansion chamber into the metering receptacle, thereby determining the volume of liquid to be delivered.

2. Apparatus for the delivery of predetermined volumes of liquid as claimed in claim 1, further comprising ducts through which any leakages of air at the valves can escape to the atmosphere.

3. Apparatus for the delivery of predetermined volumes of liquid, comprising: a vertical annular metering receptacle, a vertical tube fitting snugly within the inner wall of the annular receptacle and rotatably mounted therein, the said tube and the said inner wall being formed with apertures at different levels so arranged that apertures in the tube can be brought into and out of registration with apertures in the inner wall by rotating the tube, a source of supply of liquid to be delivered, a valve for establishing and interrupting communication at will between the metering receptacle and the source of supply of liquid, a conduit communicating with the vertical tube for the discharge of liquid from the apparatus, compressed air storage chambers, means for connecting one of the compressed air storage chambers to an external source of compressed air, means for connecting another of the compressed air storage chambers with the metering receptacle, non-return valve means connecting the compressed air storage chambers with one another, an expansion chamber interposed between the compressed air storage chambers and the metering receptacle, the expansion chamber being in communication with one of the compressed air storage chambers only in one particular position of the rotatable tube, and a manipulating member for rotating the tube and actuating the valves.

4. Apparatus for the delivery of predetermined volumes of liquid as claimed in claim 3, further comprising ducts for maintaining constant communication with the atmosphere during the earlier part of the movement of the manipulating means, that is, until the discharge outlets open.

5. Apparatus for the delivery of predetermined volumes of liquid, comprising: a vertical annular metering receptacle, a vertical tube fitting snugly within the inner wall of the annular receptacle and rotatably mounted therein, the said tube and the said inner wall being formed with apertures at different levels so arranged that apertures in the tube can be brought into and out of registration with apertures in the inner wall by rotating the tube, pan-like extensions extending radially outwards from the apertures in the inner wall of the annular receptacle and disposed in such relation to said apertures as to increase the effective horizontal length of these apertures, a source of supply of liquid to be delivered, a valve for establishing and interrupting communication at will between the metering receptacle and the source of supply of liquid, a conduit communicating with the vertical tube for the discharge of liquid from the apparatus, and a manipulating member for rotating the tube and actuating the valves.

6. Apparatus for the delivery of predetermined volumes of liquid comprising a liquid metering receptacle, a valve for controlling the discharge of variable quantities of liquid from said receptacle, an air storage chamber, means for connecting said chamber to a source of compressed air, an expansion chamber intermediate the receptacle and the chamber, and manually operable means for controlling communication between the expansion chamber and the receptacle and between the storage chamber and the expansion chamber.

7. Apparatus for the delivery of predetermined volumes of liquid comprising a metering receptacle formed with outlet apertures at different levels, a hollow tubular member rotatable in said receptacle and having an internal wall dividing said member into two chambers, means communicating with one of said chambers for controlling the discharge of liquid from said receptacle through said apertures, valve means for supplying compressed air to the other chamber, and means for controlling the passage of compressed air from the second chamber to said receptacle.

8. An apparatus as claimed in claim 7 wherein said passage control means is operable to open passage into the receptacle only when the supply of compressed air to the second chamber is interrupted by said valve means.

MAXIMILIANO ALVAREZ LIPKAU.

REFERENCES CITED

The following references are of record in the file of this patent:

UNITED STATES PATENTS

| Number | Name | Date |
|---|---|---|
| 1,538,787 | Fillmore | May 19, 1925 |
| 1,745,896 | Gueux | Feb. 4, 1930 |

FOREIGN PATENTS

| Number | Country | Date |
|---|---|---|
| 191,011 | Great Britain | Oct. 11, 1923 |
| 547,558 | France | Sept. 30, 1921 |
| 614,855 | France | Dec. 24, 1926 |